July 28, 1931. H. NISCHKE 1,816,395
ANTISLIPPING DEVICE FOR VEHICLE WHEELS
Filed July 17, 1928
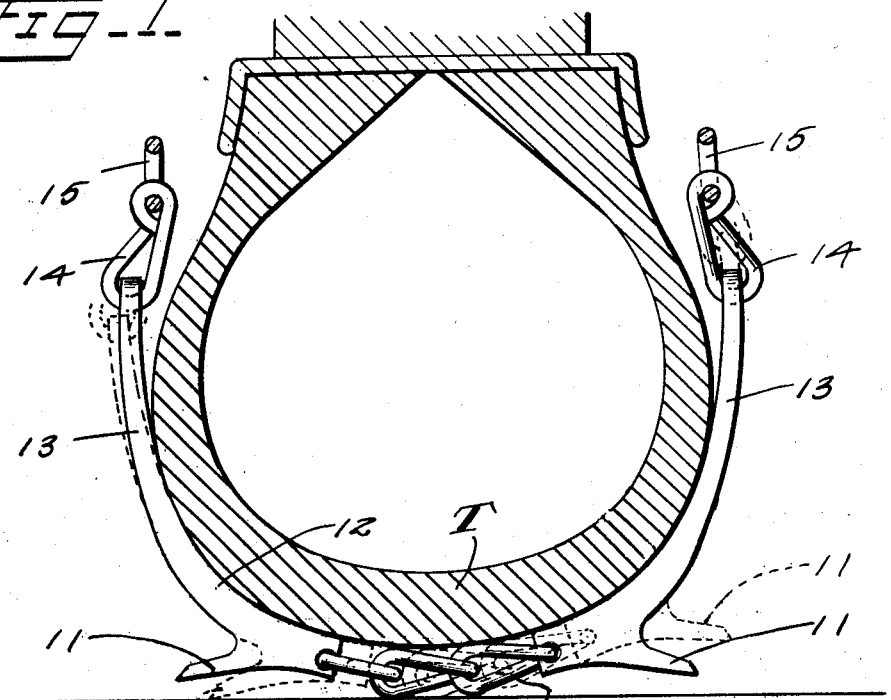
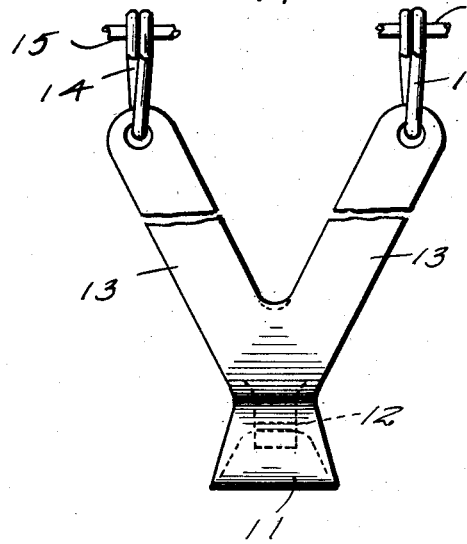
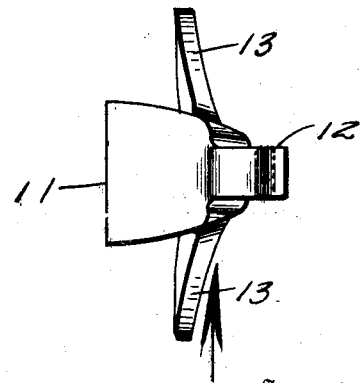
Inventor
*Henry Nischke*
By *Watson E. Coleman*
Attorney Patented July 28, 1931

1,816,395

UNITED STATES PATENT OFFICE

HENRY NISCHKE, OF SOUTH MILWAUKEE, WISCONSIN, ASSIGNOR OF ONE-HALF TO ANTON HARTMAN, OF WESCOTT, WISCONSIN

ANTISLIPPING DEVICE FOR VEHICLE WHEELS

Application filed July 17, 1928. Serial No. 293,329.

This invention relates to anti-slipping devices for vehicle wheels and more particularly to a cross chain or connector for the side chains thereof.

An important object of the invention is to provide a device embodying anti-skidding lugs which are normally maintained out of engagement with the surface of the roadway over which the vehicle is passing and which, in event the vehicle skids, are brought into play to engage the road bed and check the skidding motion.

A further object of the invention is to provide a device of this character which may be very readily and cheaply produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a sectional view through a tire having applied thereto an anti-skidding element constructed in accordance with my invention, parts being shown in solid lines in their normal position, the dotted lines indicating the movement of the element in response to a skid;

Figure 2 is a side elevation of the calk element;

Figure 3 is an end elevation thereof.

Referring now more particularly to the drawings, the numeral 10 generally designates a central chain section adapted to overlie the tread T of a vehicle tire. The numeral 11 designates spade calks, each having at one side an eye 12 for engagement with an end link of the chain section 10 and at its opposite side a pair of diverging arms 13. These arms are curved to conform to the curvature of the side walls of the tire and are provided at their ends with short chain sections 14 adapted to engage the side chain 15 of the anti-slipping device. The section 10 is of such length and the construction of the spade calks is such that in normal operation of the vehicle, these calks do not come into engagement with the road bed and substantially parallel the same so that in event of accidental contact, the points thereof will not be dulled. However, upon skidding, the chain section 10 moves circumferentially of the tire, bringing one or the other of the calks 11 into alignment with the tread to engage the road bed. The connections with the side chains should be of such character that transverse circumferential movement of the calks 11 upon the tire T will be limited when these calks align with the center of the tread.

It will be obvious that a construction of this character may be very readily and cheaply manufactured and will be durable and efficient in service. It will also be obvious that the construction hereinbefore set forth is capable of a certain range of change and modification without materially departing from the spirit of the invention and I accordingly do not limit myself to such specific structure except as hereinafter claimed.

I claim:—

An anti-skid device comprising a pair of substantially V shaped members of longitudinally arcuate formation adapted to be positioned upon the opposite sides of the tire and to conform to the shape thereof, each of said members being adapted to lie flat against the outer face of the tire, a relatively short chain section disposed transversely of the tire tread and connecting the adjacent ends of said members, and a laterally directed divergent calk formed integrally with each of said members at the apex thereof, said calks being normally free from contact with the roadway, one of said calks engaging the roadway upon side slipping of the tire whereby to resist further side slipping of the tire.

In testimony whereof I hereunto affix my signature.

HENRY NISCHKE.